(12) United States Patent
Deau et al.

(10) Patent No.: US 9,676,140 B2
(45) Date of Patent: Jun. 13, 2017

(54) METHOD FOR MANUFACTURING CONTAINERS, INCLUDING AN ANTICIPATED BOXING OPERATION

(75) Inventors: Thierry Deau, Octeville-sur-Mer (FR); Mikael Derrien, Octeville-sur-Mer (FR); Pierrick Protais, Octeville-sur-Mer (FR); Franck Santais, Octeville-sur-Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 102 days.

(21) Appl. No.: 14/115,735

(22) PCT Filed: May 15, 2012

(86) PCT No.: PCT/FR2012/051079
§ 371 (c)(1),
(2), (4) Date: Feb. 10, 2014

(87) PCT Pub. No.: WO2012/156638
PCT Pub. Date: Nov. 22, 2012

(65) Prior Publication Data
US 2014/0145378 A1    May 29, 2014

(30) Foreign Application Priority Data
May 19, 2011    (FR) ...................................... 11 54353

(51) Int. Cl.
*B29C 49/42* (2006.01)
*B29C 49/56* (2006.01)
(Continued)

(52) U.S. Cl.
CPC .......... *B29C 49/4242* (2013.01); *B29C 49/18* (2013.01); *B29C 49/56* (2013.01);
(Continued)

(58) Field of Classification Search
None
See application file for complete search history.

(56) References Cited

U.S. PATENT DOCUMENTS 5,585,065 A * 12/1996 Nakamaki et al. ........... 264/521
5,785,921 A *  7/1998 Outreman ............... B29C 49/48
                                                          264/529
(Continued)

FOREIGN PATENT DOCUMENTS

EP    0 559 103 A1    9/1993
EP    1 922 256       5/2008
(Continued)

*Primary Examiner* — Monica Huson
(74) *Attorney, Agent, or Firm* — Sughrue Mion, PLLC

(57) ABSTRACT

Method of manufacturing a container from a blank of plastic material, within a mold provided with a wall defining a cavity with the impression of the container, and a mold bottom that is movable with respect to the wall between a retracted position and a deployed position in which it extends protruding into the interior of the cavity in order to form a hollow recess in the container. The method includes inserting the blank into the mold; a pre-blowing operation including injecting a fluid under pressure into the blank, at a pre-blowing pressure; a blowing operation including injecting a fluid under pressure into the blank at a blowing pressure that is greater than the pre-blowing pressure; and a boxing operation, initiated prior to the blowing operation, and including moving the movable mold bottom from its retracted position to its deployed position.

11 Claims, 4 Drawing Sheets

(51) Int. Cl.
*B29C 49/78* (2006.01)
*B29C 49/18* (2006.01)
B29C 49/12 (2006.01)
B29C 49/48 (2006.01)

(52) U.S. Cl.
CPC .............. B29C 49/78 (2013.01); *B29C 49/12* (2013.01); *B29C 2049/4892* (2013.01)

(56) References Cited

U.S. PATENT DOCUMENTS 6,277,321 B1 * 8/2001 Vailliencourt .......... B29C 49/18 264/529
2009/0139996 A1 6/2009 Jacson et al.

FOREIGN PATENT DOCUMENTS

| EP | 2 173 637 | 4/2010 |
| WO | 2007/020346 A1 | 2/2007 |
| WO | 2009/050346 A1 | 4/2009 |

* cited by examiner

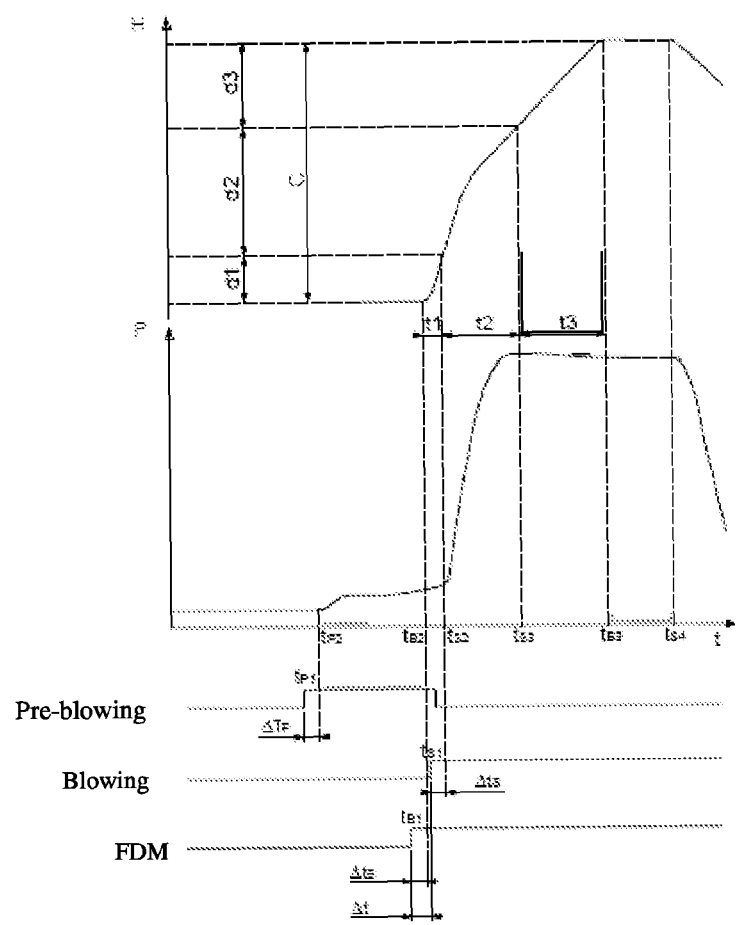

METHOD FOR MANUFACTURING CONTAINERS, INCLUDING AN ANTICIPATED BOXING OPERATION

The invention concerns the manufacture of containers by blow molding blanks of plastic material such as polyethylene terephthalate (PET).

Blow molding (possibly combined with stretching), is a conventional technique for manufacturing containers. This technique consists of inserting the blank (i.e., a preform or an intermediate container having undergone a preforming operation), previously heated to a temperature above the glass transition temperature (about 80° C. for PET), into a mold having a wall defining a cavity with the impression of the container, and injecting into the blank, through the neck, a fluid such as a gas (generally air), under pressure to press the material against the wall of the mold.

For some applications, hollow recesses must be formed in the container, particularly for aesthetic purposes (for example creation of contours), or functional purposes (to produce a handle for gripping the container), or structural purposes (for example to produce side panels or an overstretched bottom intended to absorb the deformation of the container during hot filling).

When such a recess reaches a certain depth, the container cannot be blown in an ordinary mold because, in spite of the high blowing pressure (generally more than 30 bars), the pressure is insufficient to perfectly apply the material against the relief of the mold intended to form the recess, especially in areas opposite the neck of the container from which the blow bubble is developed.

Also, molds are usually used that are provided with movable inserts that are initially withdrawn into the wall of the mold and are deployed during blowing to push the wall of the container, as illustrated in European patent application EP 1 922 256 or the corresponding American patent application US 2009/139996 (Sidel), or even the American Patent U.S. Pat. No. 5,785, 921 (Sidel).

This technique, commonly called "boxing," is used in particular for forming containers provided with an integrated handle, or an over-stretched bottom intended to absorb the deformation of the container during hot filling; see European patent application EP 2 173 637 (Sidel).

The technique of boxing is complex because, depending on the shape and depth of the recesses to be produced, the push by the insert can lead to a thinning of the material, and even to local breaking of the wall of the container, rendering it unusable. This is why the adjustment of machines used for boxing is delicate; it is generally entrusted to experienced operators whose skill at guesswork makes it possible to produce containers that are in conformity. However, it is common for the adjustment parameters (blowing pressure and flow rate, speed of movement of the insert, etc.), although initially correct, to undergo an uncontrolled drift during manufacturing that affects the quality of the containers. Since experienced operators are not always available to correct the settings, it is sometimes necessary to stop the production line to prevent the accumulation of nonconforming containers.

The invention seeks to perfect the techniques of manufacturing containers with boxing, particularly by facilitating the automation thereof.

To that end, the invention proposes a method of manufacturing a container from a blank of plastic material, within a mold provided with a wall defining a cavity with the impression of the container, and a mold bottom that is movable with respect to the wall between a retracted position in which it extends retracted with respect to the cavity, and a deployed position in which it extends protruding into the interior of the cavity in order to form a hollow recess in the container, which comprises:

An operation of inserting the blank into the mold;

A pre-blowing operation consisting of injecting a fluid under pressure into the blank, at a so-called pre-blowing pressure, A blowing operation, consecutive to the pre-blowing operation, consisting of injecting a fluid under pressure into the blank at a so-called blowing pressure that is greater than the pre-blowing pressure;

A boxing operation, initiated prior to the blowing operation, and consisting of moving the movable mold bottom from its retracted position to its deployed position.

Containers formed by this method reliably and recurrently have an acceptable shape and good mechanical performance. Insofar as it is possible to adjust the machine parameters to initiate the boxing prior to the blowing, the automation of the method is thus benefited.

More specifically, a command to open an electromagnetic boxing valve being given at instant tB1 and a command to open an electromagnetic blowing valve being given at instant tS1, the interval $\Delta t$ between the instants tB1 and tS1 is preferably chosen so that an interval t1 between the actual instant of starting the movement of the mold bottom and the actual instant of starting the blowing is such that t1>0, where:

$$t1 = \Delta t - \Delta t_B + \Delta t_S$$

$\Delta t_B$ is the response time of the electromagnetic boxing valve;

$\Delta t_S$ is the response time of the electromagnetic blowing valve.

Moreover, the interval t1 is preferably chosen so that t1/t2 falls between 0.05 and 0.5, where t2 is the duration of increase in pressure of the blank after the actual start of blowing, upon completion of which the pressure remains substantially equal to the blowing pressure.

Furthermore, the speed of movement of the mold bottom is advantageously set during the interval t1 so that d1/C falls between 0.05 and 0.5, where d1 is the distance traveled by the mold bottom during the interval t1 and C is the stroke distance of the mold bottom, between its lower position and its upper position.

It is also preferable to perform the boxing operation after the end of the pressure buildup in the blank, upon completion of which the pressure remains substantially equal to the blowing pressure.

More specifically, the boxing operation is advantageously performed after a predetermined time period t3 following the end of the pressure buildup in the blank.

Furthermore, the speed of movement of the mold bottom will preferably be set during the interval t3 so that d3/C falls between 0.05 and 0.6, where d3 is the distance traveled by the mold bottom during the interval t3 and C is the stroke distance of the mold bottom, between its lower position and its upper position.

Other objects and advantages of the invention will be seen from the following description, provided with reference to the appended drawings, in which:

FIG. 4 is a diagram on which the following are drawn in parallel:
- the curve of pressure in the container,
- the position of the mold bottom,
- the control timelines of the pre-blowing, blowing and boxing operations.

Figure 1:
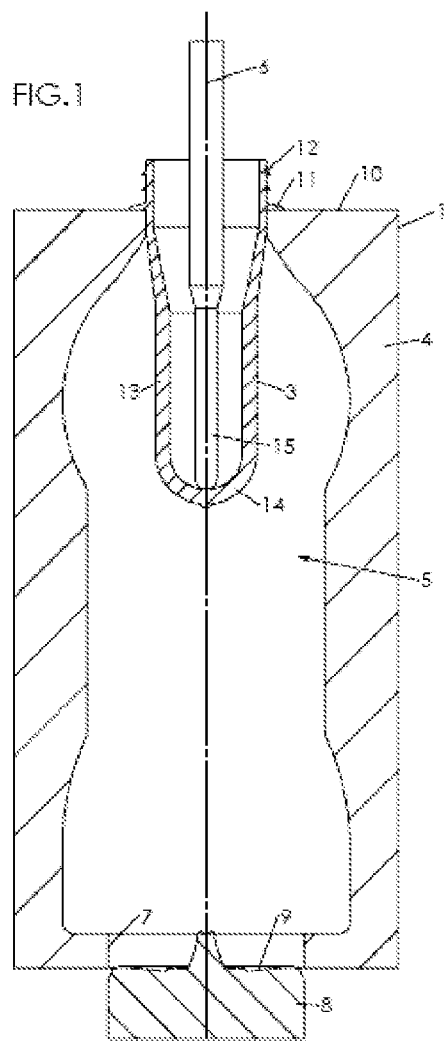
FIG. 1 is a cross-sectional view showing a mold in which the forming of a container takes place, shown at the instant of the beginning of a pre-blowing operation.
Figure 2:
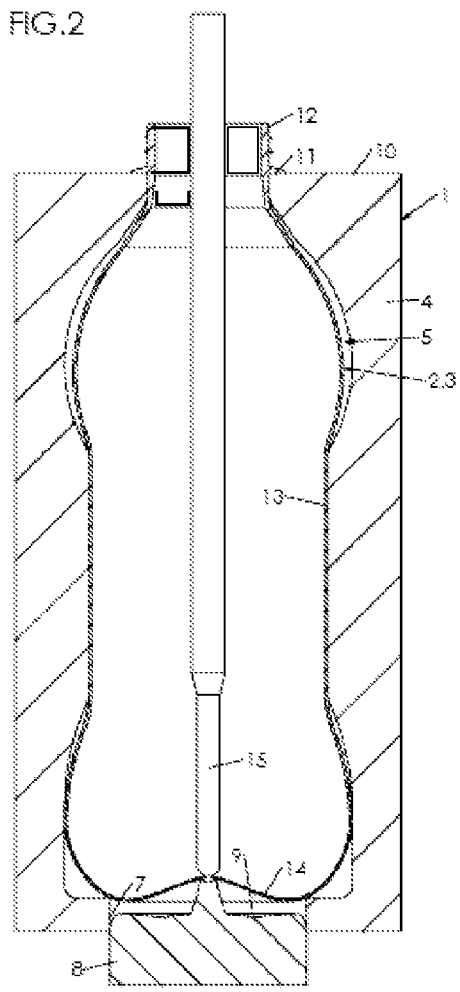
FIG. 2 is a view similar to FIG. 1, at the end of the pre-blowing operation.
Figure 3:
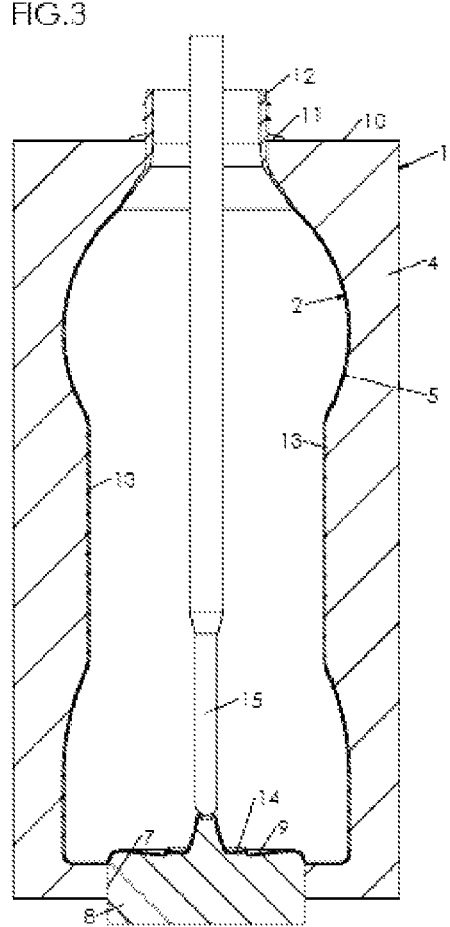
FIG. 3 is a view similar to FIG. 1, at the end of the boxing operation.

FIGS. 1 to 3 show a mold 1 for manufacturing a container 2 by stretch blowing from a blank 3 (in practice, this is generally a preform obtained by injection) made of plastic material.

Said mold 1 comprises a wall 4 defining an internal cavity 5 around a principal axis 6 of the mold, which, when the containers to be formed are symmetrical in revolution, forms an axis of symmetry of the mold 1.

The cavity 5 partially defines an impression for the container 2. A lower part of the wall 4 has an opening 7 defining a passage for a mold bottom 8 mounted movably with respect to the wall 4 between a lower position, illustrated in FIGS. 1 and 2, in which the mold bottom 8 is separated downwards from the opening 7, and an upper position, illustrated in FIG. 3, in which the mold bottom 8 blocks the opening 7. The mold bottom 8 has an upper surface 9, which, in the upper position of the mold 1, closes the cavity 5, thus completing the impression of the container 2, against which the material is applied during blowing. The distance, denoted C, separating the lower position of the mold from its upper position, is called the "stroke" of the mold bottom.

The preform 3, then the container 2 formed therefrom, rest on an upper face 10 of the mold 1 by means of a collar 11 of the preform 3, respectively of the container 2, which delimits a neck 12 of the preform 3, respectively of the container 2, held outside the mold 1.

Beneath the collar 11, the preform 3 (then the container 2) has a body 13 that extends in an overall axial direction, and a bottom 14, which is first hemispherical (FIG. 1), then, once formed against the mold bottom 8 (FIG. 3), extends in an overall radial direction from a lower extremity of the body 13.

Following is the procedure for manufacturing the container 2 from a preform 3.

With the mold 1 in its configuration illustrated in FIG. 1, with the bottom 8 in its lower position, the preform 3, previously heated to a temperature above the glass transition temperature of the material (about 80° C. for PET), is inserted into the mold.

A stretch rod 15, movable in the axial direction, is then inserted into the preform t3 through the neck 12; when the rod 15 reaches the bottom 14 of the preform 3, the pre-blowing is begun by injecting into the preform 3 a fluid (particularly air) at a pre-blowing pressure (less than 15 bars).

The speed of stretching and the air flow rate are such that the rod 15 remains in contact with the bottom 14 of the preform 3 throughout the pre-blowing.

When the rod 15 reaches the mold bottom 8, pressing the bottom 14 of the container being formed against said mold bottom (FIG. 2), the mold bottom 8 is still in its lower position.

The pre-blowing pressure is not sufficient to press the material tightly against the wall 4 of the mold 1, and it is necessary to inject into the container 2 being formed a blowing pressure $P_S$ that is greater than the pre-blowing pressure (in practice the blowing pressure $P_S$ is equal to or greater than 15 bars).

However, initiating the blowing too soon can lead to the deployment of the material through the opening 7, beyond the cavity 5, in the space between the wall 4 and the mold bottom 8, and thus to a pinching of the material.

This is the reason the operation of raising the mold bottom 8, called boxing, is initiated slightly in advance of the blowing operation. More specifically, the advance, denoted t1, of the boxing before the blowing is predetermined, being chosen so that the material of the bottom 14 can begin to be deployed downwards beyond the cavity 5 without, however, risking being pinched between the opening 7 and the mold bottom 8. The material benefits in that there is a slight over-stretching favoring the orientation of the molecules (and thus the rigidity), without, however, being pinched between the mold bottom 8 and the wall 4 of the mold 1.

Shown in FIG. 4 are curves representing, as a function of time t:
- at the top, the axial position (or height, denoted H) of the mold bottom 8,
- in the middle, the pressure P in the container 2 during forming;
- at the bottom, the timelines of the electromagnetic valves that control the pre-blowing, blowing and boxing operations, i.e., the movement of the mold bottom 8 (FDM [fond de moule (mold bottom)]).

The curves are synchronized on the time axis that is common to them, the vertical dotted lines making it possible to compare curves at certain selected instants.

The command to open the pre-blowing electromagnetic valve is given at an instant $t_{P1}$ called "pre-blowing starting point." Because the pre-blowing electromagnetic valve is affected by the response time $\Delta t_P$, the pressure P in the container 2 undergoes an increase at an instant $t_{P2}$ such that $t_{P2} = t_{P1} + \Delta t_P$.

Similarly, the command to open the blowing electromagnetic valve is given at an instant $t_{S1}$ called "blowing starting point." Because the blowing electromagnetic valve is affected by a response time $\Delta t_S$, the pressure P in the container 2 undergoes an inflection (sudden increase) at an instant called "actual start of blowing" $t_{S2}$ such that $t_{S2} = t_{S1} + \Delta t_S$.

Finally, the command to open the boxing electromagnetic valve is given at an instant $t_{B1}$ called "boxing starting point." Because the boxing electromagnetic valve is affected by the response time $\Delta t_B$, the movement of the mold bottom 8 begins at an instant called "actual start of boxing" $t_{B2}$ such that $t_{B2} = t_{B1} \Delta + t_B$.

As we have already indicated, and as can be seen in FIG. 4, the boxing is initiated prior to the blowing: $t_{B2} < t_{S2}$. The interval t1 between the instant $t_{B2}$ of the actual start of boxing and the instant $t_{S2}$ of the actual start of blowing, as well as the speed of movement of the mold bottom 8, are selected so that on the one hand, the corresponding movement d1 of the mold bottom 8 is large enough to avoid pinching the material, and on the other hand, is small enough to avoid tearing it and to maximize the subsequent stroke of the mold bottom during the continuation of the blowing.

Moreover, it can be seen in FIG. 4 that the boxing is initiated when the pre-blowing pressure is substantially stabilized. In this way, the start of movement of the bottom 8 at each blowing station begins at a substantially identical bubble volume, which makes it possible to ensure good stability of the boxing and blowing operations at each station.

It is not enough to control the boxing starting point prior to the blowing starting point ($\Delta t$ denotes the offset between the boxing and blowing starting points: $\Delta t = t_{S1} - t_{B1}$). Indeed, the response times of the boxing and blowing electromagnetic valves must be taken into account. In fact, the interval t1 is calculated from predetermined and known parameters $\Delta t$, $\Delta t_B$ and $\Delta t_S$: $t1=\Delta t - \Delta t_B + \Delta t_S$.

Because the electromagnetic valve response times $\Delta t_B$ and $\Delta t_S$ are not adjustable but are known and fixed (except for the close response times, which can be compensated), it is therefore sufficient to adjust $\Delta t$ in order to set t1, since any variation of $\Delta t$ results in an identical variation of t1.

The instant at which the pressure in the container stops increasing because it has reached its maximum (i.e., the blowing pressure $P_s$) is denoted as $t_{S3}$, and t2 is the interval separating said instant $t_{S3}$ from the instant $t_{S2}$ of the actual start of blowing: $t2=t_{S3}-t_{S2}$. The interval t2 corresponds to the duration of buildup of pressure in the container 2 after the instant $t_{S3}$ of the start of actual blowing.

The blowing process is conventional, the blowing pressure $P_s$ being applied for a predetermined period of time in order to maintain the container 2 in extended contact with the wall 4 of the mold 1 in order to solidify and stabilize the material. Indeed, it can be seen in FIG. 4 that the pressure in the container 2 reaches a blowing stage (i.e., it remains substantially constant and equal to the blowing pressure) after the instant $t_{S3}$. Finally, $t_{S4}$ denotes the end-of-blowing instant, which begins a degassing (or sweep) phase during which the application of the blowing pressure stops and the container 2 is vented to the atmosphere.

As can be seen in FIG. 4, at the instant $t_{S3}$, the boxing has not ended, the mold bottom 8 having traveled only part of its stroke. The distance traveled by the mold bottom 8 during the interval t2 is denoted as d2.

The instant when the mold bottom 8 reaches its upper position, having traveled its full stroke, is denoted as $t_{B3}$. As is evident from the foregoing, and as is illustrated in FIG. 4, the instant $t_{B3}$, which marks the end of boxing, occurs after the instant $t_{S3}$, i.e., the boxing is completed after the start of the blowing stage (in other words, after the end of the increase in pressure of the container 2 due to blowing). In other words, $t_{B3}>t_{S3}$, or t3>0. The instant $t_{B3}$ of the end of boxing can correspond with the instant $t_{S4}$ of the end of blowing, but it is preferable that the instant $t_{B3}$ not occur after the instant $t_{S4}$. To summarize, therefore: $t_{S3}<t_{B3}\leq t_{S4}$.

The interval separating the instant $t_{S3}$ of the start of the blowing stage and the instant $t_{B3}$ of the end of boxing is denoted as t3: $t3=t_{B3}-t_{S3}$, and d3 is the distance traveled by the mold bottom 8 during the interval t3.

Finally, $T_B$ denotes the total time of the boxing, equal to the sum of the intervals t1, t2 and t3: $T_B=t1+t2+t3$, during which the mold bottom 8 has traveled its full stroke C, equal to the sum of the movements d1, d2 and d3: $C=d1+d2+d3$.

We have seen (and this is clearly visible in FIG. 4) that the boxing is initiated prior to the blowing, and ends after the beginning of the blowing stage, i.e., that the interval t2 is strictly included in the time period $T_B$, which we have expressed by the following inequalities: t1>0 and t3>0.

Indeed, if t1≤0, the material of the bottom is pinched between the mold bottom 8 and the wall 4, or at the very least there are variations in quality in the formation of the bottoms 8 from one blowing station to another. Moreover, if t3≤0, the bottom 14 of the container will be improperly formed.

However, if the conditions t1>0 and t3>0 are necessary to obtain containers 2 that are acceptable from a formal point of view as well as for mechanical performance, additional recommendations enable the shape and mechanical performance of the containers 2 to be improved. In particular, the distances d1, d2 and d3 traveled by the mold bottom 8 during boxing are important criteria.

Because of the diversity of situations encountered in industrial production, it is not useful to provide precise numerical data from the tests conducted by the inventors in order to validate the model. However, the inventors have determined that if the ranges of values are respected, it is possible to satisfy the shape and performance criteria.

Provided in the following table are the preferred ranges for the choice of parameters related to the boxing, i.e., t1 and d1 on the one hand, and t3 and d3 on the other hand, as a function of the parameters t2, C, $t_{S3}$ and $t_{S4}$, which are the parameters related to the blowing (blowing pressure and flow rate, heating temperature) and are extrinsic to the boxing:

| Parameter | min. | max. |
|---|---|---|
| t1/t2 | 0.05 | 0.5 |
| t3 | $0.1 \cdot t2$ | $t_{S4}-t_{S3}$ |
| d1/C | 0.05 | 0.5 |
| d3/C | 0.05 | 0.6 |

It should be noted that the parameters of movement and intervals can be controlled simultaneously by adjusting the speed of movement of the mold bottom 8, which can be controlled by a flow variator (or restrictor) of the pressure driving a lifting cylinder of the mold bottom 8.

As can also be seen in FIG. 4, the boxing speed is not necessarily constant during boxing. Indeed, although it is important to initiate boxing before beginning blowing, it is preferable that the advance time (i.e., the interval t1) be brief, because in this phase of the cycle, the pressure in the preform remains low, so that the forces opposing the raising of the bottom 8 are negligible and the movement thereof can be very fast. On the contrary, by maximizing the interval t1, the effective boxing stroke during which the formation of the bottom 8 actually takes place would be minimized, which would risk the occurrence of defects.

However, the movement of the mold bottom 8 during the increase of pressure (duration t2) is naturally slowed by the increase of the pressure in the preform 3—which results in maximizing the distance d3. This promotes a good impression of the material on the mold bottom 8.

In the example illustrated in FIG. 4, it can be seen that the displacement curve of the mold bottom 8 changes between $t_{S2}$ and $t_{S3}$, so that on average, the speed of displacement of the mold bottom 8, denoted V2, during the pressure buildup is less than the speed of displacement of the mold bottom 8, denoted V1, prior to the instant $t_{S2}$ of the actual start of blowing. This inflection in the curve corresponds to the instant when the resisting force that opposes the rod 15 when the bottom 8 is raised becomes less than the resisting force opposed by the blowing pressure on the upper surface 9 of the bottom 8.

Furthermore, it can be seen that the speed is maintained substantially constant after said inflection, so that on average, the speed, denoted V3, of displacement of the mold bottom 8 on the blowing stage is less than the speed V2 of displacement of the mold bottom 8 during the increase in pressure. This further improves the impression of the bottom 14 of the container 2 on the mold bottom 8, because the slowing of the raising of the bottom 8, which is combined with the maximum pressure in the container 2, enables the impression thereof to be finalized. Thus, it can be seen that in order to obtain well formed containers 2 with good mechanical performance, it is preferable to set the boxing parameters in such a way as to satisfy the following double inequality V1≥V2≥V3.

The invention claimed is:

1. A method of manufacturing a container from a blank of plastic material, using a mold provided with a wall defining a cavity with an impression of the container, and a mold bottom that is movable with respect to the wall between a retracted position in which the mold bottom extends retracted with respect to the cavity, and a deployed position in which the mold bottom extends protruding into the interior of the cavity in order to form a hollow recess in the container, the method comprising:
   an operation of inserting the blank into the mold;
   a pre-blowing operation comprising injecting a fluid under pressure into the blank, at a pre-blowing pressure,
   a blowing operation, consecutive to the pre-blowing operation, comprising injecting a fluid under pressure into the blank at a blowing pressure that is greater than the pre-blowing pressure; and
   a boxing operation comprising moving the movable mold bottom from retracted position to the deployed position to push a bottom of the container as the movable mold bottom moves and shapes the bottom of the container;
   wherein the pre-blowing operation and the blowing operation are carried out in the mold and wherein the boxing operation is initiated prior to the blowing operation, and
   wherein the boxing operation occurs during the blowing operation.

2. The method according to claim 1, wherein a command to open an electromagnetic boxing valve being given at instant $t_{B1}$ and a command to open an electromagnetic blowing valve being given at instant $t_{S1}$, the interval $\Delta t$ between the instants $t_{B1}$ and $t_{s1}$ is chosen so that an interval t1 between the actual instant of starting the movement of the mold bottom and the actual instant of starting the blowing is such that t1>0,
   where:

$$t1 = \Delta t - \Delta t_B + \Delta t_s$$

$\Delta t_B$ is the response time of the electromagnetic boxing valve;
   $\Delta t_s$ is the response time of the electromagnetic blowing valve.

3. The method according to claim 2, wherein the interval t1 is chosen so that t1/t2 falls between 0.05 and 0.5, where t2 is the duration of increase in pressure of the blank after the actual start of blowing, upon completion of which the pressure in the blank remains substantially equal to the blowing pressure.

4. The method according to claim 2, wherein the speed of movement of the mold bottom is set during the interval t1 so that d1/C falls between 0.05 and 0.5, where d1 is the distance traveled by the mold bottom during the interval t1 and C is the stroke distance of the mold bottom between its lower position and its upper position.

5. The method according to claim 1, wherein the boxing operation is accomplished after the end of a pressure buildup in the blank, upon completion of which the pressure in the blank remains substantially equal to the blowing pressure.

6. The method according to claim 4, wherein the boxing operation is accomplished after a predetermined time period t3 following the end of the buildup of pressure in the blank.

7. The method according to claim 6, wherein the speed of movement of the mold bottom is set during the interval t3 so that d3/C falls between 0.05 and 0.6, where d3 is the distance traveled by the mold bottom during the interval t3 and C is the stroke distance of the mold bottom between its lower position and its upper position.

8. The method according claim 1, wherein the movable mold bottom does not extend into the mold cavity portion that defines the blow molded container in the retracted position.

9. A method of manufacturing a container from a blank using a mold, the method comprising the following steps:
   inserting the blank into the mold;
   injecting, in a pre-blowing step, a fluid under pressure into the blank at a first pressure,
   injecting, in a blowing step, a fluid under pressure into the blank at a second pressure that is greater than the first pressure; and
   moving, in a boxing step, a movable mold bottom from a retracted position to a deployed position to push a bottom of the container as the movable mold bottom moves and shapes the bottom of the container;
   wherein the boxing step is initiated prior to the blowing step and occurs during the blowing step.

10. The method according claim 9, wherein a single mold is used for each of the method steps.

11. The method according claim 9, wherein the movable mold bottom not extend into the mold cavity portion that defines the blow molded container.

* * * * *